United States Patent [19]

Sandhu et al.

[11] E Patent Number: Re. 32,136

[45] Reissued Date of Patent: May 6, 1986

[54] ELECTROSTATOGRAPHIC DEVELOPERS COMPRISING TONERS CONTAINING A POLYESTER HAVING P-HYDROXYBENZOIC ACID RECURRING UNITS

[75] Inventors: M. Akram Sandhu, Rochester; John F. Wright, Penfield; Michel F. Molaire, Rochester, all of N.Y.

[73] Assignee: Eastman Kodak Company, Rochester, N.Y.

[21] Appl. No.: 700,848

[22] Filed: Feb. 11, 1985

Related U.S. Patent Documents

Reissue of:

[64] Patent No.: 4,446,302
Issued: May 1, 1984
Appl. No.: 517,142
Filed: Jul. 25, 1983

U.S. Applications:

[62] Division of Ser. No. 398,138, Jul. 14, 1982, Pat. No. 4,416,965.

[51] Int. Cl.[4] ..... C08G 63/16

[52] U.S. Cl. ..... 528/302; 528/206; 528/272; 528/300; 528/301; 528/305; 528/308.6; 528/308.7

[58] Field of Search ..... 528/206, 272, 300, 301, 528/302, 305, 308.6, 308.7

[56] References Cited

U.S. PATENT DOCUMENTS

| | | | |
|---|---|---|---|
| 4,075,173 | 2/1978 | Maruyama et al. | 528/206 |
| 4,140,644 | 2/1979 | Sandhu et al. | 252/621 |
| 4,224,433 | 9/1980 | Calundann et al. | 528/128 |
| 4,252,921 | 2/1981 | Merrill et al. | 525/437 |
| 4,267,304 | 5/1981 | Feasey et al. | 528/193 |
| 4,271,249 | 6/1981 | Gilliams et al. | 430/101 |
| 4,310,655 | 1/1982 | Reimschuessel | 528/176 |

FOREIGN PATENT DOCUMENTS

| | | |
|---|---|---|
| 56-65146 | 6/1981 | Japan . |
| 7414076 | 10/1974 | Netherlands . |
| 2091897 | 8/1982 | United Kingdom . |

OTHER PUBLICATIONS

"Journal of Polymer Science", vol. 14, p. 2043 (1976).

Research Disclosure, Item 16228, Oct. 1977, pp. 14–15, Brozek et al., "Polyester Resins for Electrographic Toners".

Research Disclosure, Item 16733, Mar. 1978, pp. 24–25, Sandhu et al., "Polyester Electrographic Toner Compositions".

*Primary Examiner*—Lucille M. Phynes

*Attorney, Agent, or Firm*—John R. Everett

[57] ABSTRACT

Polyesters having recurring units derived from diols and diacids and recurring units derived from p-hydroxybenzoic acid is disclosed. Electrographic developer compositions comprising toner particles containing the polyesters are also disclosed.

8 Claims, No Drawings

ELECTROSTATOGRAPHIC DEVELOPERS COMPRISING TONERS CONTAINING A POLYESTER HAVING P-HYDROXYBENZOIC ACID RECURRING UNITS

Matter enclosed in heavy brackets [ ] appears in the original patent but forms no part of this reissue specification; matter printed in italics indicates the additions made by reissue.

This is a division of application Ser. No. 398,138, filed July 14, 1982, now U.S. Pat. No. 4,416,965.

*This application is a reissue application for U.S. Pat. No. 4,446,302, based on U.S. Ser. No. 517,142, filed July 25, 1983, by M. Akram Sandhu, John F. Wright and Michel F. Molaire.*

FIELD OF THE INVENTION

This invention relates to polyester resins useful as improved dry electrographic toners and developers.

BACKGROUND OF THE INVENTION

Electrographic imaging and developing processes such as electrophotographic imaging processes and techniques have been extensively described in both the patent and other literature. General descriptions are found in U.S. Pat. Nos. 2,221,776, issued Nov. 19, 1940; 2,277,013, issued Mar. 17, 1942; 2,297,691, issued Oct. 6, 1942; 2,357,809, issued Sept. 12, 1944; 2,551,582, issued May 8, 1951, 2,825,814, issued May 4, 1958; 2,833,648, issued May 6, 1958; 3,220,324, issued Nov. 30, 1965; 3,220,831, issued Nov. 30, 1965; 3,220,833, issued Nov. 30, 1965; and many others. These processes involve the step of forming a latent electrostatic charge image on an insulating electrographic element. The electrostatic latent image is then rendered visible by treatment with an electrostatic developing composition or developer.

Electrostatic developers generally include a carrier that is triboelectrically chargeable. The carrier is a magnetic material such as iron filings, powdered iron or iron oxide on a non-magnetic substance like glass beads or crystals of inorganic salts such as sodium or potassium chloride. In addition to the carrier, developers include a toner which is electrostatically attractable to the carrier. The toner is generally a particulate polymeric material which is colored with a colorant such as carbon black for image viewing purposes.

To develop an electrostatic image, the dry developer is overall applied to the electrostatically charged surface by various techniques such as cascade development and magnetic brush development.

In conventional electrophotographic applications, the developed image is formed on a photoconductive element. If desired, the image is then transferred to a receiving sheet. The transferred image is then fixed, generally by heating to fuse the transferred image. Thus, the toner material must be capable of being fused under temperature conditions which will avoid any charring, burning or other physical damage to the receiver sheet which is generally paper.

The ability of the toner to fuse adequately at a relatively low temperature is quite important. This toner property is described herein as a low "onset of fusing" temperature. The use of a toner having this property allows operation at lower temperature, thus consuming less energy and increasing machine life by reducing the degradation effects of heat on elastomeric fusing roller materials, electronic components, and the like; and further allows higher-speed machine operation. Ideally, the toners should have an onset of fusing temperature which is just high enough to avoid coalescence at the temperature of machine operation.

"Off-setting" is the undesirable transfer of toner particles from the developed toner image carried on a receiving sheet to the surface of a heated fusing device. The surface of the fusing device becomes contaminated with toner particles. Upon further use of the contaminated fusing device, toner particles adhering to the surface of the fusing member are transferred to subsequent receiving sheets. As a result, either a ghost image of previously fixed images is formed on subsequent receiving sheets, or undesirable deposits of toner material are formed in background areas of subsequent receiving sheets.

The temperature at which the cohesive strength of the toner matrix material (or binder resin) fails and the temperature at which the toner sticks to the fusing roller and causes off-set is referred to as the "hot offset" temperature. An elevated "hot offset temperature" is desirable for a useful toner. The difference between the "onset of fusing" temperature and the "hot offset" temperature is referred to herein as "offset latitude". The greater the offset latitude is, the wider the temperature range in which the fusing roller operates.

It is also desirable for the toner material to have good grindability. This means that the toner material should be sufficiently brittle to allow the toner material to be easily ground to the desired particle size.

Polyester resins have been broadly suggested for use as a matrix material or binder for electrographic toners. U.S. Pat. No. 4,140,644, issued Feb. 20, 1979 to Sandhu et al, discloses a polyester toner composition which possesses both a low onset of fusing temperature and a high hot offset temperature. In other words, this polyester composition possesses a wide "offset latitude". However, up to now, the art has not been able to provide a polyester toner composition which possesses both a wide offset latitude and good grindability.

SUMMARY OF THE INVENTION

The present invention provides an electrographic developer composition containing toner particles comprising a polyester having recurring units derived from diols and diacids and recurring units derived from p-hydroxybenzoic acid characterized in that from about 15–60 mole percent of the recurring units of said polyesters are derived from p-hydroxybenzoic acid. The toner particles have both a wide offset latitude and good grindability.

Preferred developer compositions include toner particles in which the polyester comprises a prepolymer of a diol and a diacid compound and p-hydroxybenzoic acid. Preferred novel polyesters have the structure:

PREPOLYMER COMPONENT

Diol Component

Diacid Component p-HYDROXYBENZOIC ACID COMPONENT

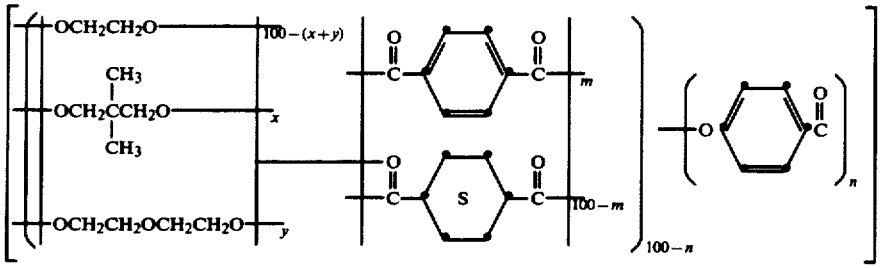

wherein x is about 0 to 100 mole percent of the prepolymer diol component;

y is about 0 to 100 mole percent of the prepolymer diol component;

m is about 20 to 100 mole percent of the prepolymer diacid component; and n is about 15 to 60 mole percent of the recurring prepolymer and p-hydroxybenzoic acid units of the polyester.

The preferred polyesters have a glass transition temperature (Tg) of about 50° to 80° C. and an inherent viscosity (I.V.) of about 0.3 to 0.7 (measured in 1:1 by weight phenol-chlorobenzene at 25° C. and 0.25 g/dl concentration). The toners prepared from the polyester compositions of the present invention possess excellent offset latitude and good grindability. Toner compositions are prepared wherein at least 75 percent of the toner particles have a size of less than about 25 microns.

Toners prepared from the polyester composition described above are particularly useful in developing any charge image. Such images are formed by a variety of electrostatographic processes, including, for example, electrophotography, electrography, photoelectrophoretic imaging, and magnetic image formation, and the like.

DETAILS OF THE INVENTION

The polyesters of this invention can be prepared by introducing all of the monomeric components simultaneously into a reaction vessel and polymerizing. However, they are prepared herein by first preparing a prepolymer starting material from the diols and diacids to be incorporated (not including p-hydroxybenzoic acid) by a conventional two-stage polyesterification reaction comprising the steps of:

1. Heating the diols and diacid esters in the presence of a catalyst, such as a mixture of zinc acetate dihydrate and antimony trioxide, in an inert atmosphere at about 190°-280° C. (preferably about 200°-260° C.);
2. Applying vacuum at the upper temperature range (260°-280° C. preferably) and continuing to heat under vacuum to build up the molecular weight; and
3. Cooling and isolating the product.

The prepolymer thus formed is then treated with the p-acetoxybenzoic acid and additional catalyst as described in Step 1 above, and polymerization and isolation are completed as described in Steps 2 and 3 above. Further details on this type of preparation of polymers from p-hydroxybenzoic acid is found in the Journal of Polymer Science, Chem. Ed., 14, 2043-2058 (1976). The degree of polymerization is monitored by determining the inherent viscosity of samples taken at periodic intervals.

Useful diols for the prepolymer include alkylene glycols, and monocyclic [and polycyclic] diols.

Monocyclic diols include 1,4-cyclohexanediol; 1,4-cyclohexanedimethanol; 1,4-cyclohexanediethanol; 1,4-bis(2-hydroxyethoxy)cyclohexane; 1,4-benzenedimethanol; 1,4-benzenediethanol and the like.

[Polyalicyclic diols from which the prepolymer may be derived include norbornylene glycol and decahydro-2,6-naphthalenedimethanol.]

Useful alkylene glycols include ethylene glycol, diethylene glycol, triethylene glycol, 1,2-propanediol, 1,3-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4-trimethyl-1,16-hexanediol, 4-oxa-2,6-heptanediol, 2,2-dimethyl-1,3-propanediol and 2,2'-oxydiethanol.

Useful diacids for the prepolymer include alicyclic, and aromatic dicarboxylic acids or their derivatives, such as esters, and anhydrides, and acid halides. Such acids include succinic acid, sebacic acid; 2-methyladipic acid, diglycolic acid, thiodiglycolic acid, fumaric acid, 1,3-cyclohexane dicarboxylic acid, 1,4-cyclohexane, dicarboxylic acid, cyclopentane-1,3-dicarboxylic acid, 2,5-norbornanedicarboxylic acid, phthalic acid, isophthalic acid, terephthalic acid, t-butylisophthalic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-oxydibenzoic acid, binaphthyldicarboxylic acid, and 9,10-triptycenedicarboxylic acid.

Examples of useful polymers include:

Poly[poly(ethylene 1,4-cyclohexanedicarboxylate:-terephthalate 23:77):1,4-oxybenzoate 75:25];

Poly[poly(2,2-dimethyl-1,3-propylene: 2,2'-oxydiethylene 80:20 terephthalate):1,4-oxybenzoate 75:25];

Poly[poly(2,2-dimethyl-1,3-propylene: 2,2'-oxydiethylene 75:25 terephthalate):1,4-oxybenzoate 75:25];

Poly[poly(ethylene 1,4-cyclohexanedicarboxylate:-terephthalate 29:71):1,4-oxybenzoate 75:25] and

Poly[poly(2,2-dimethyl-1,3-propylene: 2,2'-oxydiethylene 85:15 terephthalate):1,4-oxybenzoate 75:25].

Useful toner particles of the present invention have an average diameter between about 0.1 micron and about 100 microns, although present day office copy devices generally employ particles having an average diameter between about 1.0 and 30 microns. However, larger particles or smaller particles are useful where desired for particular methods of development or particular development conditions. For example, in powder cloud development such as described in U.S. Pat. No. 2,691,345, issued Oct. 12, 1954, extremely small toner particles on the order of about 0.01 micron are used.

Toner particles are prepared by a variety of known methods. One such method is melt-blending. Melt-blending involves melting a powdered form of the binder polymer and mixing it with other necessary or desirable addenda including colorants such as dyes or pigments. The polymer is melted on heated compounding rolls which are also useful to stir or otherwise blend the polymer and addenda so as to promote the complete intermixing of these ingredients. After thorough blending, the mixture is cooled and solidified. The resultant solid mass is then broken into small particles and finely ground to form a free-flowing powder of toner particles having the desired size.

A variety of colorant materials selected from dyestuffs and/or pigments are advantageously employed in the toner particles of the present invention. Such materials serve to color the toner and/or render it more visible. Of course, suitable toner materials having the appropriate charging characteristics can be prepared without the use of a colorant material where it is desired to have a developed image of low optical density. In those instances where it is desired to use a colorant, the colorants used can, in principle, be selected from the compounds mentioned in the Colour Index, Volumes 1 and 2, Second Edition.

Included among the vast number of useful colorants are such materials as Hansa Yellow G (C.I. 11680), Nigrosine Spirit soluble (C.I. 50415), Chromogen Black ETOO (C.I. 45170), Solvent Black 3 (C.I. 26150), Fuchsine N (C.I. 42510), C.I. Basic Blue 9 (C.I. 52015), etc. Carbon black provides a particularly useful colorant. The amount of colorant added varies over a wide range, for example, from about 1 to about 20 percent of the weight of the polyester binder. Particularly good results are obtained when the amount is from about 1 to about 10 percent.

Other modifying materials such as various long chain anionic or cationic surfactants, conductive materials, and magnetic materials are incorporated, if desired, in the toner particles of the invention. Still other toner additives which are optionally incorporated in the toner particles are materials such as those described in Jacknow et al U.S. Pat. No. 3,577,345, issued May 4, 1971.

The toners of this invention are useful in developing charge images with or without a carrier. When used with a carrier, the carriers are selected from a variety of materials. Suitable carriers useful in the invention include various non-magnetic particles such as glass beads, crystals or inorganic salts such as sodium or potassium chloride, hard resin particles, metal particles, etc. Magnetic carrier particles are also useful in accordance with the invention. Suitable magnetic carrier particles are particles of ferromagnetic materials such as iron, cobalt, nickel, and alloys and mixtures thereof. Other useful magnetic carriers are ferromagnetic particles overcoated with a thin layer of various film-forming resins, for example, the alkali-soluble carboxylated polymers described in Miller U.S. Pat. No. 3,547,822, issued Dec. 15, 1970; Miller U.S. Pat. No. 3,632,512, issued Jan. 4, 1972; McCabe U.S. Pat. No. 3,795,617, issued Mar. 5, 1974; Kasper U.S. Pat. No. 3,898,170, issued Aug. 5, 1975; Belgian Pat. No. 797,132, issued Sept. 21, 1973; and Kasper U.S. Pat. No. 3,795,618, issued Mar. 5, 1974. Other useful resin coated magnetic carrier particles include carrier particles coated with various fluorocarbons such as polytetrafluoroethylene, polyvinylidene fluoride, and mixtures thereof including copolymers of vinylidene fluoride and tetrafluoroethylene.

Another useful carrier comprises a mass of passivated, finely-divided particles of magnetic stainless steel. The carrier particles are prepared from magnetic stainless steel particles of at least 9 weight percent chromium content. The particles are passivated by reaction with nitric acid. This forms a chromium-rich, stable film on the particle surfaces. Before passivation the particles may also be treated, e.g., with hydrofluoric acid, to remove surface silicon. The passivated particles, preferably after thinly coating with a resin, e.g., poly(vinylidene fluoride), are mixed with toner powder for electrographic dry development.

A developer composition containing the above-described toner and carrier particles generally comprises from about 1 to about 40 percent by weight of particulate toner particles and from about 60 to about 99 percent by weight carrier particles. The carrier particles are larger than, or the same size as the toner particles. Carrier particles used in cascade or magnetic brush development have an average particle size on the order of from about 30 to about 1200 microns, preferably 60–300 microns.

The above-described toner and developer compositions are used to develop charge patterns on substrates. The development of charge patterns is carried out by a number of well-known methods. The charge pattern is carried on substrates such as a photoconductive element or a dielectric element. Suitable dry development processes include cascading a cascade developer composition across the electrostatic charge pattern as described in detail in U.S. Pat. Nos. 2,618,551; 2,618,552; and 2,638,416. Another process involves applying toner particles from a magnetic brush developer composition as described in U.S. Pat. No. 3,003,462. Still another useful development process is powder-cloud development wherein a gaseous medium such as air is used as a carrier vehicle to transport the toner particles to the electrostatic charge pattern to be developed. This development process is more fully described in U.S. Pat. No. 2,691,345 and U.S. Pat. No. 2,725,304. Yet another development process is fur brush development wherein the bristles of a brush are used to transport the toner particles to the electrostatic charge pattern to be developed. This development process is more fully described in Walkup U.S. Pat. No. 3,251,706.

As is apparent from the above discussion, the improved electrographic developers containing the toner particles of the present invention preferably comprise various types of carrier vehicles ranging from the conventional inorganic particles used in cascade developers and magnetic particles used in magnetic brush developers to gaseous media and fur brushes used in powder cloud and fur brush developers, respectively.

After development of the charge pattern with the toner particles of the invention, the developed charge pattern is fused as mentioned earlier herein to adhere the toned image to the substrate. If desired, the unfused image is transferred to another substrate such as a blank sheet of copy paper and then fused to form a permanent image thereon. Fixing is generally accomplished by heating the toned image at or above the onset of fusing temperature of the particular polymer from which the toner is formed. Heating of the toned image is carried out with fuser rollers or with radiant heat such as described in U.S. Pat. Nos. 3,666,247; 3,826,892 and 4,118,178. Other heating means such as flash fusing, hot air, or micro-wave are also useful for fusing the toners.

The following examples are provided to further demonstrate the utility and provide a better understanding of this invention. Unless otherwise specified in the examples, the following applies:

1. All inherent viscosities $\{\eta\}$ were measured at a concentration of 0.25 g/dl at 25° C. in a 1:1 by weight mixture of phenol:chlorobenzene; and
2. the thermal data were measured by differential thermal analysis (DTA) on a DuPont 900 apparatus at a heating rate of 10° C./min with the midpoint of specific heat interval taken as the glass transition temperature (Tg).

EXAMPLE 1: Preparation of Poly[poly(2,2-dimethyl-1,3-propylene:2,2'-oxydiethylane 50:50 terephthalate): 1,4-oxybenzoate 75:25]

This preparation involved two steps. First the preparation of copolyesters without the 1,4-oxybenzoate moiety and then incorporation of 1,4-oxybenzoate units into the preformed polyester.

Step 1

A polyester poly(2,2-dimethyl-1,3-propylene:2,2'-oxydiethylene 50:50 terephthalate) was prepared according to the procedure described in Example 1 of U.S. Pat. No. 4,140,644, issued Feb. 20, 1979 to Sandhu et al., except that a mole ratio of 2,2'-oxydiethanol:2,2-dimethyl-1,3-propane diol of about 0.76:0.68 was used.

Step 2

To the molten solution of preformed poly(2,2'-dimethyl-1,3-propylene:2,2'-oxydiethylene 50:50 terephthalate), (176.4 g, 0.75 mole) I.V. 0.59 dl/g at 285° C. under a blanket of nitrogen, with stirring to promote rapid mixing was added 45.0 g, 0.25 mole of p-acetoxybenzoic acid. With the evolution of acetic acid after 15 minutes, a vacuum was applied to the reaction in mixture. The reaction was continued at 285° C./0.05 mm Hg for 2 hours until stirring was very difficult. The reaction mixture on cooling under nitrogen gave a light amber polymer.

EXAMPLE 2: Preparation of Poly[poly(ethylene-1,4-cyclohexanedicarboxylate:-terephthalate 29:71):1,4-oxybenzoate 75:25]

A procedure for the preparation of a preformed copolyester from two acids and one glycol and the modification of the preformed copolyester with p-acetoxybenzoic acid is described in this example.

Step 1

Poly(ethylene 1,4-cyclohexanedicarboxylate:terephthalate 29:71)

A mixture of dimethyl 1,4-cyclohexanedicarboxylate (88.1 g, 0.40 mole), dimethyl terephthalate (194.0 g, 1.0 mole), and ethylene glycol (147.7 g, 1.7 mole) in the presence of zinc diacetate dihydrate (0.0629 g) and antimony trioxide (0.158 g) was heated at 200° C. under a slow stream of nitrogen overnight until the evolution of methanol ceased. The temperature was increased to 240° C., and the mixture was stirred under reduced pressure (0.025 mm Hg) for 3 hours until the stirring was difficult. The reaction mixture on cooling under nitrogen afforded a water white, amorphous polymer Tg 59° C., I.V. 0.58 dl/g).

Step 2

A reaction between preformed poly(ethylene 1.4-cyclohexanedicarboxylate:terephthalate 29:17)(144.0 g, 0.75 mole) and p-acetoxybenzoic acid (45.0 g, 0.25 mole) under the condition described in Example 1 yielded an off-white, amorphous polymer (Tg 68° C., I.V. 0.33 dl/g).

A series of polyester compositions prepared according to one of the two foregoing methods are set out in Table I.

TABLE I

| Polymer No. | Prepolymer Content (Mole %) 100 − (x + y) Ethylene Glycol | x 2,2-Dimethyl-1,3-Propanediol | y 2,2'-Oxydiethanol | m Terephthalic Acid | 100 − m 1,4-Cyclohexane-dicarboxylic Acid | Mole % of Complete Polymer* p-Hydroxy benzoic Acid |
|---|---|---|---|---|---|---|
| Control 1 | 0 | 80 | 20 | 100 | 0 | 0 |
| Control 2 | | | | | | |
| 1 | 100 | — | — | 83 | 17 | 25 |
| 2 | 100 | — | — | 77 | 23 | 25 |
| 3 | 100 | — | — | 71 | 29 | 25 |
| 4 | 100 | — | — | 67 | 33 | 25 |
| 5 | 100 | — | — | 62 | 38 | 25 |
| 6 | — | 100 | — | 100 | — | 25 |
| 7 | — | 90 | 10 | 100 | — | 25 |
| 8 | — | 85 | 15 | 100 | — | 25 |
| 9 | — | 80 | 20 | 100 | — | 25 |
| 10 | — | 75 | 25 | 100 | — | 25 |
| 11 | — | 70 | 30 | 100 | — | 25 |
| 12 | — | 60 | 40 | 100 | — | 25 |
| 13 | — | 50 | 50 | 100 | — | 25 |
| 14 | — | 20 | 80 | 100 | — | 25 |
| 15 | — | 50 | 50 | 100 | — | 25 |
| 16 | — | — | 100 | 100 | — | 25 |

*NOTE
The polymers of Table I consist of a "prepolymer" further polymerized with P-hydroxy benzoic acid. Hence, polymer composition on mole percent basis equals total moles of prepolymer plus total moles of p-hydroxybenzoic acid.

EXAMPLES 3–15

The polymers of Table I were evaluated for inherent viscosity, glass transition temperature (Tg), and grindability. The onset of fusing and hot offset temperatures were also determined to establish fusing latitude.

Grindability was tested by feeding coarsely ground toner granules into a Trost TX Jet Mill (available from Garlock Co., Plastomer Div., Trost Mill Dept.) at a rate of about 15 grams per hour. The mill was operated at a pressure of about 70 lbs./sq. inch (4.92 Kg/cm$^2$) with compressed air. Grindability of the material tested was considered acceptable if at least 75% of the ground particles possess a size of less than 25 microns. The toners were prepared according to the melt-blending procedure previously described herein.

The onset of fusing and the hot offset temperatures were determined as follows. Deposits of toner, applied to paper by means of a tissue or camel hair brush, were fixed to the paper by means of a roller fuser. The contact roller fuser consisted of an internally heated compliant fusing roll and a non-compliant pressure roll. The former was covered with about 50 mils of Ecosil® 4952 (Emerson-Cuming Co.), the latter with Teflon® FEP (DuPont). The two rolls were engaged at a pressure of 15 pounds per linear inch. The surface speed of the rolls was 10 inches per second. A very slight amount of Dow Corning DC 200 fluid (60,000 cp) was applied to the fuser roller. Images were fused in this system at varying temperatures to establish the minimum temperature for good fusing and the temperature at which hot offset occurred on the fuser roll. The minimum temperature (onset of fusing) for fusing is defined as the temperature at which the crack resulting from folding the paper in the toned area is less than 0.2 mm while the toner is not completely removed from the cracked area.

The following results were obtained.

TABLE II

| Example No. | Polymer No. | Grind-ability | Onset of Fusing, °F./°C. | Hot Offset, °F./°C. | Fusing Latitude, °F./°C. |
|---|---|---|---|---|---|
| Control | Control 1 | no | Not Tested | Not Tested | Not Tested |
| 3 | 1 | yes | 275/135 | 325/163 | 50/28 |
| 4 | 2 | yes | 267/131 | 350/177 | 83/46 |
| 5 | 3 | yes | 250/121 | 325/163 | 75/42 |
| 6 | 4 | yes | 237/114 | 300/149 | 63/35 |
| 7 | 5 | yes | 250/121 | 300/149 | 50/28 |
| 8 | 6 | yes | Not Tested | Not Tested | Not Tested |
| 9 | 7 | yes | 287/142 | 375/191 | 88/49 |
| 10 | 8 | yes | 275/135 | 400/204 | 125/69 |
| 11 | 9 | yes | 275/135 | 400/204 | 125/69 |
| 12 | 10 | yes | 262/128 | 400/204 | 138/76 |
| 13 | 11 | yes | 262/128 | 350/177 | 88/49 |
| 14 | 12 | yes | 237/114 | 350/177 | 113/63 |

TABLE II-continued

| Example No. | Polymer No. | Grind-ability | Onset of Fusing, °F./°C. | Hot Offset, °F./°C. | Fusing Latitude, °F./°C. |
|---|---|---|---|---|---|
| 15 | 13 | yes | 212/100 | 300/149 | 88/49 |

The data of Table II shows that Examples 3–15 of Table I possess acceptable grindability whereas the grindability of the control polymer is unacceptable. The data of Table II also shows that the polyesters of the present invention provide polyester materials which form toners having a good fusing latitude.

This invention has been described in detail with particular reference to certain preferred embodiments thereof, but it will be understood that variations and modifications can be effected within the spirit and scope of the invention.

What is claimed is:

1. A polyester having recurring units derived from [diols and diacids and recurring units derived from p-hydroxybenzoic acid characterized in that from about 15–60 mole percent of the recurring units of said polyesters are derived from p-hydroxybenzoic acid.] *diacids and diols selected from the group consisting of alkylene glycols and monocyclic diols and recurring units derived from p-hydroxybenzoic acid characterized in that from about 15–60 mole percent of the recurring units of said polyesters are derived from p-hydroxybenzoic acid.*

2. A polyester having the following structure:

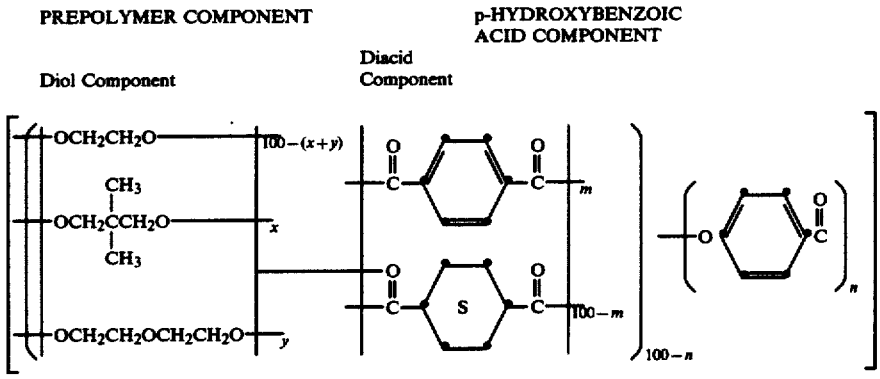

wherein x is about 0 to 100 mole percent of the prepolymer diol component;

y is about 0 to 100 mole percent of the prepolymer diol component;

m is about 20 to 100 mole percent of the prepolymer diacid component; and n is about 15 to 60 mole percent of the recurring prepolymer and p-hydroxybenzoic acid units of the polyester.

3. The polyester of claim 2 wherein m is about 30 to 75 mole percent and n is about 25 to 50 mole percent.

4. The polyester composition of claims 1 or 2 wherein said polyester has a Tg of about 50° to 80° C.

5. The polyester in claims 1 or 2 wherein said polyester has an inherent viscosity of about 0.3 to 0.7.

6. A polyester selected from the group consisting of poly[poly(ethylene 1,4-cyclohexanedicarboxylate:-terephthalate 23:77):1,4-oxybenzoate 75:25];

poly[poly(2,2-dimethyl-1,3-propylene:2,2'-oxydiethylene 80:20 terephthalate):1,4-oxybenzoate 75:25];

poly[poly(2,2-dimethyl-1,3-propylene:2,2'-oxydiethylene 75:25 terephthalate):1,4-oxybenzoate 75:25];

poly[poly(ethylene 1,4-cyclohexanedicarboxylate:-terephthalate 29:71):1,4-oxybenzoate 75:25]; and poly[poly(2,2-dimethyl-1,3-propylene:2,2'-oxydiethylene 85:15 terephthalate):1,4-oxybenzoate 75:25].

7. A method of preparing a polyester having recurring units derived from diols and diacids and recurring units derived from p-hydroxybenzoic acid characterized in that from about 15–60 mole percent of the recurring units of said polyesters are derived from p-hydroxybenzoic acid comprising the steps:

(a) forming a prepolymer by (i) heating up to three diols and up to two diacid esters in the presence of a catalyst in an inert atmosphere at about 190°–280° C.;

(ii) applying vacuum at the temperature range of 260°–280° C.;

(iii) continuing to heat under vacuum thereby building up the molecular weight of the prepolymer; and (iv) cooling and isolating the prepolymer (b) reacting the prepolymer with p-hydroxybenzoic acid in the presence of the catalyst used in step (ai) and (c) continuing the reaction until a inherent viscosity of at least 0.3 is reached.

8. The method of claim 7, wherein the polyester has the structure

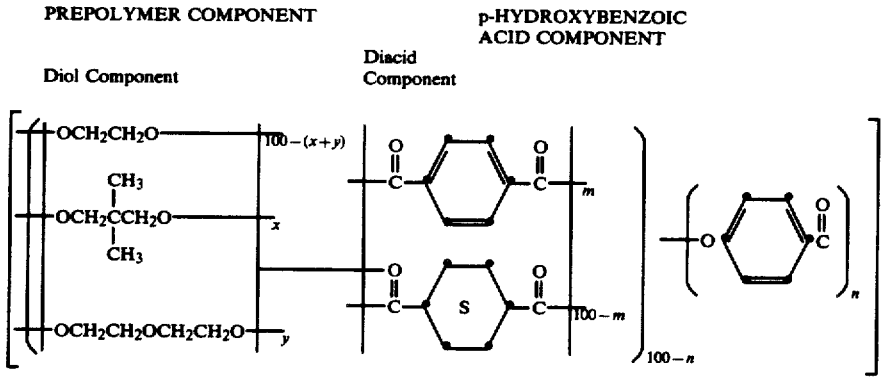

wherein x is about 0 to 100 mole percent of the prepolymer diol component;

y is about 0 to 100 mole percent of the prepolymer diol component;

m is about 20 to 100 mole percent of the prepolymer diacid component; and n is about 15 to 60 mole percent of the recurring prepolymer and p-hydroxybenzoic acid units of the polyester.

and the diols are selected from the group consisting ethylene glycol, 2,2'-oxydiethanol and 2,2-dimethyl-1,3-propanediol and the acids are selected from the group consisting of the esters of terephthalic acid.

* * * * *